June 4, 1957   F. J. LARSEN   2,794,946
CONTROL APPARATUS
Filed Jan. 21, 1954
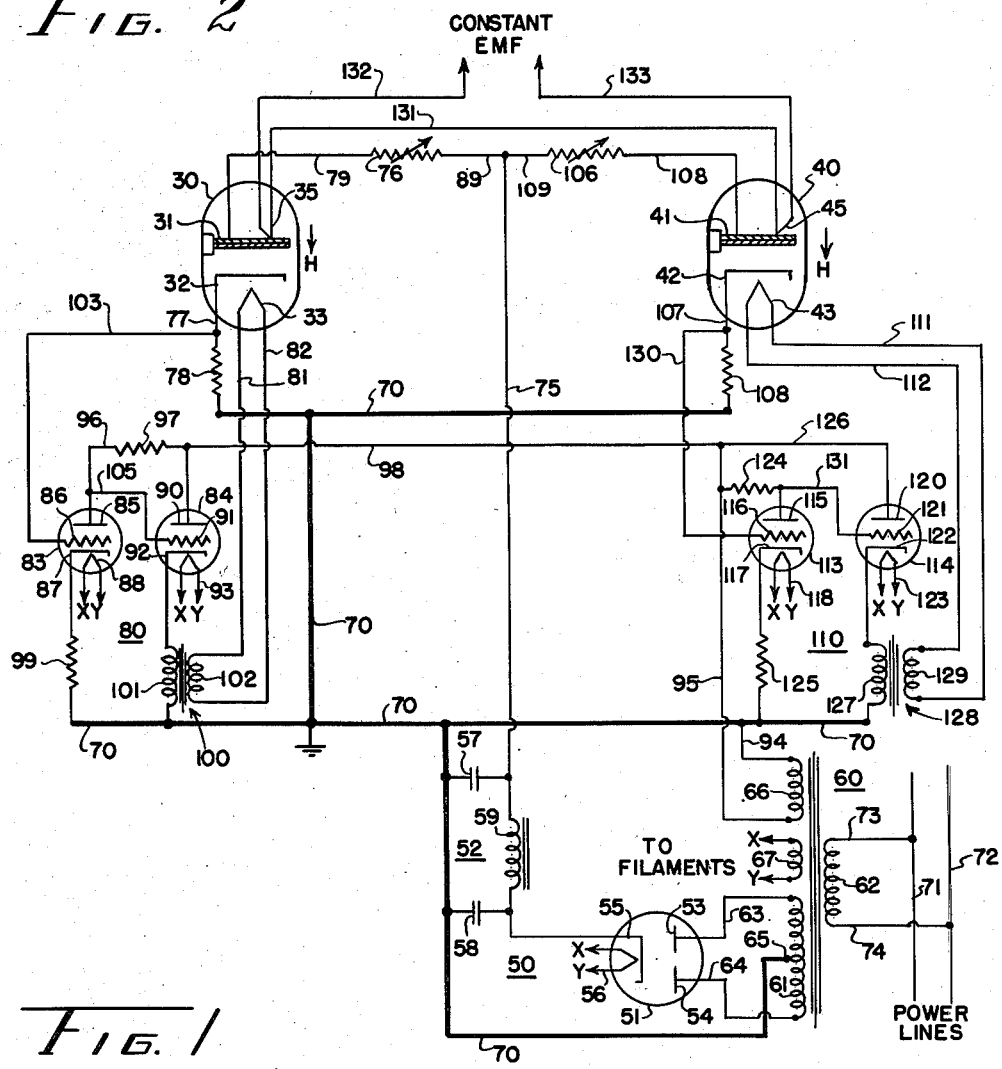
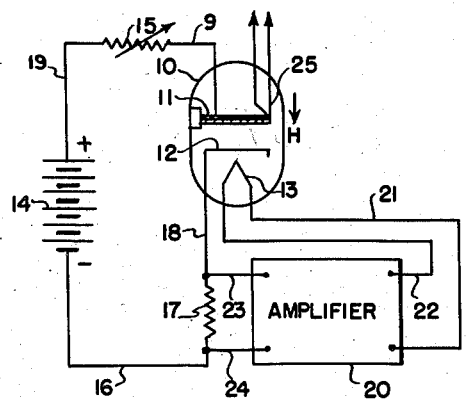
INVENTOR.
FINN J. LARSEN
BY
*George H. Fisher*
ATTORNEY

United States Patent Office 2,794,946
Patented June 4, 1957

2,794,946

CONTROL APPARATUS

Finn J. Larsen, Minneapolis, Minn., assignor to Minneapolis-Honeywell Regulator Company, Minneapolis, Minn., a corporation of Delaware Application January 21, 1954, Serial No. 405,307

18 Claims. (Cl. 321—1.5)

The present invention relates generally to devices for producing a source of constant temperature and more specifically to devices for producing a source of constant temperature for a thermoelectric device to produce a source of electromotive force. Even more specifically, the present invention relates to a dual-thermocouple system as a substitute for the conventional standard cell. In the system of the present invention the junctions of a thermocouple, thermopile or other thermoelectric device are maintained at two different but constant temperatures, and the output electromotive force of the thermoelectric device would be used as a reference potential in the same manner as a standard cell.

The conventional standard cell, which is used as a source of constant electromotive force for reference purposes, has disadvantages which make it impractical for certain applications. Among these disadvantages is its sensitivity to ambient temperature changes and vibrations which will cause the output of the standard cell to vary.

In an aircraft application, for example, the standard cell would be unsatisfactory, since it would be subject to extreme changes in ambient temperature and severe vibrations which would destroy its accuracy and its use as a source of constant reference voltage.

It is an object of the present invention to produce a source of constant electromotive force which is not subject to the disadvantages of the standard cell.

More specifically, it is an object of the present invention to produce a source of constant electromotive force which is insensitive to changes in ambient temperature and to vibrations.

A further object of the present invention is to produce a source of constant temperature, which is insensitive to ambient temperature changes and external vibrations.

A still further object of the present invention is to produce a source of constant temperature, which is insensitive to ambient temperature changes and external vibrations, to energize a thermoelectric device to cause said device to produce a constant source of electromotive force.

Another object of the present invention is to produce a source of constant current.

Still another object of the present invention is to produce a source of constant current in an electron discharge device which in turn will produce a constant plate temperature.

Still a further object of the present invention is to produce a source of constant current in an electron discharge device which in turn will produce a constant plate temperature to cause a constant source of electromotive force from a thermoelectric device attached to said plate.

These and other objects of the present invention will be understood upon consideration of the following specification, claims and drawings.

Figure 1 is a wiring diagram of a preferred embodiment of the invention.

Figure 2 is a more detailed wiring diagram showing the amplifier and power supply portions of Figure 1.

Figure 1 shows an electron discharge device in the form of a diode 10 having an anode member 11, a cathode member 12 and a filament 13. A direct current power supply 14 supplies the operating potentials to the diode 10 by having its positive terminal connected to the anode member 11 through a conductor 19, a variable resistor 15 and a conductor 9, and its negative terminal connected to the cathode 12 through conductor 16, cathode resistor 17 and conductor 18. The filament 13 heats the cathode member 12 to operating temperature by means of power supplied to the filament 13 from the amplifier 20 through conductors 21 and 22. The control signal for the amplifier 20 is developed across cathode resistance 17 and applied to the input of amplifier 20 through conductors 23 and 24. A thermoelectric generator junction 25 is attached to the anode member 11. The anode member 11 may consist of a bi-metallic member or any other conductive material movable with temperature or it may comprise an anode surface attached to a bi-metallic support member or any support member movable with temperature.

Figure 2 shows a diode 30 and a diode 40 each having the same construction as the diode 10 of Figure 1. Diode 30 has an anode member 31, a cathode member 32 and a filament 33. Attached to the anode member 31 is a thermoelectric junction 35. The diode 40 has an anode member 41, a cathode member 42 and a filament 43. Attached to the anode member 41 is a thermoelectric junction 45.

The operating potentials for the diodes 30 and 40 are supplied by the direct current power supply 50. The power supply 50 consists of a full wave rectifying tube 51 and a filter network 52. Rectifying tube 51 has an anode 53, an anode 54, a common cathode 55 and a filament 56. The filter network 52 includes a capacitor 57, a capacitor 58 and a choke 59. Power is supplied to the anodes 53 and 54 of rectifying tube 51 by means of a center tapped secondary winding 61 of a transformer 60 having a primary winding 62. One end of secondary winding 61 is connected to anode 53 through a conductor 63 and the other end of secondary winding 62 is connected to anode 54 through a conductor 64. The center tap 65 of secondary winding 61, which is the negative terminal of power supply 50, is connected to ground through conductor 70. In addition to primary winding 62 and secondary winding 61 transformer 60 has a secondary winding 66 and a secondary winding 67. Filament 56 of rectifying tube 51 is energized by secondary winding 67 through connections not shown. Primary winding 62 of transformer 60 is connected to alternating current power lines 71 and 72 through conductors 73 and 74 respectively.

Anode member 31 of diode 30 is connected to the positive potential supply bus 75, extending from the positive side of power supply 50, through a conductor 79, a variable resistance 76 and conductor 89. Cathode member 32 of diode 30 is connected to the negative and grounded side of power supply 50 through a conductor 77, cathode resistance 78 and ground conductor 70.

Associated with the diode 30 is an amplifier 80 which supplies power to the filament 33 of diode 30 through conductors 81 and 82. Amplifier 80 consists of two stages of amplification employing triodes 83 and 84. Triode 83 has an anode 85, a control electrode 86, a cathode 87 and a filament 88. Triode 84 has an anode 90, a control electrode 91, a cathode 92 and a filament 93. Alternating current operating potentials are supplied to the triodes 83 and 84 of amplifier 80 by means of an alternating current potential supply bus 95 connected to one side of secondary winding 66 of transformer 60, the other side of which is connected to ground conductor 70 through a conductor 94. Filaments 88 and 93 of triodes 83 and 84 respectively are energized by secondary winding 67 through connections not shown. Anode 85 of triode 83 is connected to alternating current supply bus 95 through conductor 96, resistance 97 and conductor 98. The anode 90 of triode 84 is connected to alternating current supply bus 95 through conductor 98. The cathode 87 of triode 83 is connected to the ground conductor 70 through a resistance 99. The cathode 92 of triode 84 is connected to the ground conductor 70 through primary winding 101 of a transformer 100.

The input signal for amplifier 80 is developed across cathode resistor 78, and is applied to the input circuit of triode 83 by means of conductors 103 and 70. The output of triode 83 is applied to the input circuit of triode 84 by means of conductors 105 and 70. The output from triode 84 is supplied to the filament 33 of diode 30 through conductors 81 and 82 from secondary winding 102 of transformer 100, the primary winding 101 of which is connected in the output circuit of triode 84.

The anode member 41 of the diode 40 is connected to the positive potential supply bus 75, extending from the positive side of power supply 50, through a conductor 108, a variable resistor 106 and a conductor 109. Cathode member 42 of diode 40 is connected to the negative and grounded side of power supply 50 through a conductor 107, cathode resistor 108, and ground conductor 70.

Associated with the diode 40 is an amplifier 110 which supplies power to the filament 43 of diode 40 through conductors 111 and 112. The amplifier 110 consists of two stages of amplification employing triodes 113 and 114. Triode 113 has an anode 115, a control electrode 116, a cathode 117 and a filament 118. The triode 114 has an anode 120, a control electrode 121, a cathode 122 and a filament 123. The anode 115 of triode 113 is connected to alternating current potential supply bus 95, extending from the ungrounded side of secondary winding 66, through a resistor 124. The cathode 117 of triode 113 is connected to the grounded side of secondary winding 66 through cathode resistor 125 and ground conductor 70. The anode 120 of triode 114 is connected to alternating current potential supply bus 95 through a conductor 126. The cathode 122 of triode 114 is connected to ground through primary winding 127 of a transformer 128 and ground conductor 70. Filaments 118 and 123 of triodes 113 and 114 respectively are energized by secondary winding 67 through connections not shown.

The input signal voltage for amplifier 110 is developed across cathode resistor 108, and is applied to the input circuit of triode 113 through conductors 130 and 70. The output of triode 113 is applied to the input circuit of triode 114 through conductors 131 and 70. The output from triode 114 is supplied to filament 43 of diode 40 through conductors 111 and 112 from secondary winding 129 of transformer 128, the primary winding 127 of which is connected in the output circuit of triode 114.

Thermoelectric junctions 35 and 45 attached to anode members 31 and 41 respectively of diodes 30 and 40 respectively, cooperate to form a thermoelectric generator whose output is a constant electromotive force as will be explained later. Thermoelectric junctions 35 and 45 may be the hot and cold junctions respectively, or vice versa, of a thermocouple, thermopile, or other thermoelectric device. Thermoelectric junctions 35 and 45 are connected together by common conductor 131, and have independent conductors 132 and 133 respectively which form the output conductors for the thermoelectric generator.

Operation

The operation of Figure 1 will now be taken up with the assumption that the amplifier 20 has the same number of amplification stages as amplifiers 80 or 110 of Figure 2. Furthermore, it will be assumed that the amplifier stages of amplifier 20 have the same construction and type of power supply as do amplifiers 80 and 110 of Figure 2.

With the power supply 14 supplying the operating potentials to the anode member 11 and the cathode member 12 of the diode 10, and with the amplifier 20 supplying the operating current to the filament 13 of the diode 10, the current through the diode 10 will stabilize and assume a steady state value. This steady state value will be dependent upon the circuit constants and the value of variable resistance 15. When the current through the diode 10 has stabilized and assumed a steady state value, the heat generated in the anode member 11, which is dependent upon the value of the current flowing through the anode member 11, will also stabilize and assume a constant temperature. As stated previously, the anode member 11 may consist of a bi-metallic member or it may comprise an anode surface attached to the bi-metallic support member. Due to this type of anode construction, the anode member 11 will assume a position relative to the cathode in accordance with the value of the temperature of the anode member 11. In a preferred embodiment of the invention the movement of the anode member 11 was such that the anode to cathode distance was increased or decreased depending upon the direction of movement of the anode member 11. There are many factors which can effect this stable operation of the system and cause the anode member 11 to vary in temperature. A large change in the ambient temperature of the area in which the diode 10 is situated could effect the temperature of the anode member 11. However, since the diode 10 is of vacuum type, the anode heat losses will be principally by radiation and not by conduction or convection, and the effect of changes in the ambient temperature can be substantially eliminated by using a tube envelope for the diode 10 which has its inside surface silvered. Other factors which could effect a change in the temperature of the anode member 11 include a change in the potential supplied to the diode 10 by the power supply 14 or a change in the value of the operating potentials supplied by the amplifier 20. There are any number of other factors which could also effect the temperature of the anode member 11.

Assuming that the amplifier 20 has two stages of amplification as stated above, the anode member 11 of diode 10 is mounted in such a manner that, if the temperature of the anode member 11 decreases, the anode member 11 will move so that the anode to cathode distance increases, thereby decreasing the plate current. This in turn, will decrease the voltage drop across cathode resistor 17 which decreases the input to amplifier 20. As will be explained in conjunction with Figure 2, the decrease in the input of the amplifier 20 will cause an increase in the current supplied to the filament 13 through lines 21 and 22 and the output of amplifier 20. The increase in current supplied to the filament 13 will cause the cathode member 12 to be heated to a higher temperature, thus the cathode member 12 will emit more electrons thereby increasing the plate current and the plate temperature to the original stable condition. If the plate temperature rises above the stable condition, the reverse process occurs. In other words, the anode member 11 will move in such a manner that the anode to cathode distance decreases causing an increase in plate current, which in turn causes the voltage drop across cathode resistor 17 and the input to the amplifier 20 to increase. This increased voltage at the input of amplifier 20 causes a decrease in the output current supplied to the filament 13 which will result in sufficient drop in the emission of electrons from the cathode member 12 to decrease the plate current and plate temperature to the original stable condition. Thus, there is a control point for the anode current and temperature. This control point can be changed by altering the value of the operating potentials supplied to the diode 10. This change can be made by varying the value of variable resistance 15 in the anode circuit of diode 10. From this, it can be seen that the anode member 11 offers a source of constant temperature for a thermoelectric junction 25. The thermoelectric junction 25 could be the cold junction of a thermocouple used in a temperature control system to measure the absolute temperature of, for example, a furnace to be controlled. In this manner, the controlled temperature of the furnace would be an absolute temperature and would not be dependent upon ambient temperature outside the furnace. The system of Figure 1 could also be used in conjunction with a duplicate system to produce a source of constant electromotive force, as will now be described in conjunction with Figure 2.

Referring to Figure 2, and in particular to diode 30 and its associated amplifier 80, let it be assumed that the diode 30 has stabilized and the anode current and temperature is at a constant value depending upon the setting of variable resistance 76. The anode member 31 is mounted in such a manner that if the temperature of anode member 31 decreases, the anode to cathode distance will increase causing the anode current to decrease. This decrease in plate current will cause a decrease in voltage drop across cathode resistor 78. This decrease in voltage drop across cathode resistor 78 is coupled to the input circuit of diode 83 of amplifier 80 through conductors 103 and 70. Therefore, the potential difference between the control electrode 86 and the cathode 87 of triode 83 will be less positive than it was previously, which in turn causes a decrease in the current flowing through triode 83 thereby causing an increase in the potential of anode 85 of triode 83. This increase in anode potential will be coupled to the control electrode 91 of triode 84 through conductor 105 causing the current through triode 84 to increase. Increased current in triode 84 will cause an increase in the current flowing through primary winding 101 of transformer 100, thereby causing more current to be induced in secondary winding 102. Since secondary winding 102 of transformer 100 is connected to filament 33 through conductors 81 and 82, the current supplied to filament 33 will increase heating the cathode member 32 to a higher temperature which will in turn emit more electrons to increase the anode current of diode 30. Due to the action of amplifier 80, the anode current of diode 30 will increase to its normal stable value thereby causing anode member 31 to assume its normal stable temperature and position. If the temperature of anode member 31 rises, the reversed process occurs as was explained in conjunction with Figure 1. If the anode member 31 was mounted so that the anode to cathode distance would increase with an increase in temperature of anode member 31, the amplifier 80 would have to be modified to contain either one, three, or any odd number of similar stages in order that the current supplied to the filament 33 would change in the desired manner to restore the diode 30 to its normal stable condition. Thus, it can be seen, that the thermoelectric junction 35 attached to anode member 31 will be maintained at a constant temperature. This constant temperature can be changed as in diode 10 of Figure 1, by varying the value of anode potential supplied to the diode 30. The anode potential supplied to the anode 30 can be changed by varying the variable resistor 76.

As can be seen from Figure 2, the diode 40 and amplifier 110 are the duplicates of diode 30 and amplifier 80 respectively, and that they operate in the same manner. Therefore, it is believed to be unnecessary to duplicate the explanation of the operation of diode 30 and its associated amplifier 80 in order to explain the operation of diode 40 and its associated amplifier 110.

By changing the value of variable resistance 76 as explained previously, the temperature of anode member 31 and thermoelectric junction 35 can be varied. In the same manner, the variation of value of variable resistance 106 will vary the temperature of anode member 41 and thermoelectric junction 45. Thus, it can be seen that thermoelectric junctions 35 and 45 can be maintained at two different constant temperatures enabling the thermoelectric junctions 35 and 45 to cooperate by means of conductors 131, 132, and 133 to produce a source of constant electromotive force. While it may be impractical to produce an electromotive force of 1.019 volts, the approximate standard cell potential, it is possible to produce a very stable electromotive force which will maintain its potential, to an accuracy of a standard cell under ideal conditions, under very adverse conditions.

While I have illustrated and described an embodiment of my invention, it is to be understood that this is for purposes of illustration only and that my invention is to be limited only by the scope of the appended claims.

I claim as my invention:

1. Apparatus of the class described for maintaining a constant temperature on an anode member comprising: an electron discharge device having an electron emissive cathode and an anode member; means mounting said anode member for movement with temperature, said anode member having one end thereof rigidly mounted and the remainder thereof free to flex in accordance with the temperature of said anode member; a source of current; circuit means connecting said source of current to said cathode and said anode to cause current to flow therebetween, said anode member assuming a temperature and a position in accordance with the magnitude of said current; means for maintaining said current at a constant magnitude thereby maintaining said anode member at a constant temperature; and output means producing an electrical potential proportional to said anode temperature.

2. Apparatus of the class described comprising: an electron discharge device having an electron emissive cathode and an anode; said anode comprising a bimetallic element having one end thereof rigidly mounted on the remainder thereof flexing in accordance with the temperature of said anode; a source of current; circuit means connecting said source of current to said cathode and said anode to cause current to flow therebetween, said anode assuming a temperature and a position in accordance with the magnitude of said current; means for maintaining said current at a constant magnitude thereby maintaining said anode at a constant temperature; and means attached to said anode member producing an electrical potential proportional to said anode temperature.

3. Apparatus of the class described for maintaining a constant temperature on an anode member comprising: an electron discharge device having an electron emissive cathode and an anode member; means mounting said anode member for movement with temperature thereby varying the anode to cathode distance in accordance with said temperature; a source of current; circuit means connecting said source of current to said cathode and said anode member to cause current to flow therebetween, said anode member assuming a temperature and a corresponding position with respect to said cathode in accordance with the magnitude of said current; means for maintaining said current at a constant magnitude thereby maintaining said anode member at a constant temperature; and output means producing an electrical output proportional to said anode temperature.

4. Apparatus of the class described comprising: an electron discharge device having an electron emissive cathode and an anode member; means mounting said anode member for movement with temperature; a source of current; circuit means, including impedance means, connecting said source of current to said cathode and said anode member to cause current to flow therebetween; means responsive to said current flowing in said impedance means for causing said current to be maintained at a constant magnitude; and means connected to said anode member producing an electrical potential proportional to said anode temperature.

5. Apparatus of the class described comprising: an electron discharge device having an electron emissive cathode and an anode member; means mounting said anode member for movement with temperature; heater means connected to heat said cathode; a source of current; circuit means, including impedance means, connecting said source of current to said anode member and said cathode to cause a current to flow therebetween; amplifier means having an input circuit connected to said impedance means and an output circuit connected to said heater means, said amplifier means being responsive to said current to maintain said current at a constant magnitude; and means attached to said anode member producing an output proportional to said anode temperature.

6. Apparatus of the class described comprising: an electron discharge device having an electron emissive cathode and an anode member; means mounting said anode member for movement with temperature; heater means connected to heat said cathode; a source of current; circuit means, including impedance means, connecting said source of current to said anode member and said cathode to cause a current to flow therebetween, said anode member assuming a temperature and a position with respect to said cathode in accordance with the magnitude of said current; amplifier means having an input circuit connected to said impedance means and an output circuit connected to said heater means to control the energization of said heating means, said amplifier means being responsive to said current to maintain said current at a constant magnitude thereby maintaining said anode member at a constant temperature; and means connected to said anode member producing an electrical potential proportional to said anode temperature.

7. Apparatus of the class described comprising: an electron discharge device having a cathode and an anode member; means mounting said anode member for movement with temperature, said anode member having one end thereof rigidly mounted and the remainder thereof free to flex in accordance with the temperature of said anode member thereby varying the spacing of said anode member relative to said cathode in accordance with said temperature; a resistance; a source of current; circuit means connecting said discharge device, said resistance, and said source of current in a series arrangement causing current to flow therethrough producing a signal voltage across said resistance and causing said anode member to assume a temperature in accordance with the magnitude of said current; amplifier means responsive to said signal voltage to produce an output voltage; and control means responsive to said output voltage for maintaining said current at a constant magnitude thereby maintaining said anode member at a constant temperature.

8. Apparatus of the class described comprising: an electron discharge device having an electron emissive cathode and an anode member; means mounting said anode member for movement with temperature; thermoelectric means attached to said anode member; a source of current; circuit means connecting said source of current to said cathode and said anode member causing current to flow therebetween, said anode member assuming a temperature in accordance with the magnitude of said current; and means for maintaining said current at a constant magnitude thereby maintaining said anode member and said thermoelectric means at a constant temperature.

9. Apparatus of the class described comprising: an electron discharge device having an electron emissive cathode and an anode member; means mounting said anode member for movement with temperature, said anode member having one end thereof rigidly mounted and the remainder thereof free to flex in accordance with the temperature of said anode member thereby varying the spacing of said anode member relative to said cathode in accordance with said temperature; thermoelectric means attached to said anode member; a resistance; a source of current; circuit means connecting said discharge device, said resistance, and said source of current in a series arrangement causing current to flow therethrough producing a signal voltage across said resistor, said anode member assuming a temperature in accordance with the magnitude of said current; amplifier means responsive to said signal voltage to produce an output voltage; and control means responsive to said output voltage for maintaining said current at a constant magnitude thereby maintaining said anode member and said thermoelectric means at a constant temperature.

10. Apparatus of the class described comprising: an electron discharge device having a cathode and an anode member; means mounting said anode member for movement with temperature; thermoelectric means attached to said anode member; a current source; circuit means connecting said current source to said cathode and said anode member, including impedance means in series therewith, to cause current to flow therethrough, said anode member assuming a temperature corresponding to the magnitude of said current; and means responsive to the current flowing in said impedance means for causing said current to be maintained at a constant magnitude thereby maintaining said anode member and said thermoelectric means at a constant temperature.

11. Apparatus of the class described comprising: an electron discharge device having an electron emissive cathode and an anode member; means mounting said anode member for movement with respect to said cathode with temperature; thermoelectric means attached to said anode member; heater means connected to heat said cathode; a source of current; circuit means, including series impedance means, connecting said source of current to said anode member and said cathode to cause a current to flow therethrough, said anode member assuming a temperature and a position in accordance with the magnitude of said current; and amplifier means having an input circuit connected to said impedance means and an output circuit connected to said heater means, said amplifier means being responsive to said current to maintain said current at a constant magnitude thereby maintaining said anode member and said thermoelectric means at a constant temperature.

12. Apparatus of the class described comprising: a first and second electron discharge device each having a cathode and an anode member; means mounting said anode member for movement with temperature; thermoelectric means comprising two junctions, the first of said junctions being attached to said anode member of said first discharge device and the second of said junctions being attached to said anode member of said second discharge device; a source of current; circuit means including a first impedance means connecting said source of current to said anode member and said cathode of said first discharge device thereby causing a first current to flow through said first impedance means and said first discharge device, said last named anode member assuming a first temperature in accordance with the magnitude of said first current; additional circuit means including a second impedance means connecting said source of current to said anode member and said cathode of said second discharge device thereby causing a second current to flow through said second impedance means and said second discharge device, said last named anode member assuming a second temperature in accordance with the magnitude of said second current; a first means being responsive to said first current flowing in said first impedance means to cause said first current to be maintained at a first constant magnitude thereby maintaining said first thermoelectric junction at a first constant temperature; and a second means being responsive to said second current flowing in said second impedance means to cause said second current to be maintained at a second constant magnitude thereby maintaining said second thermoelectric junction at a second constant temperature, said first and second thermoelectric junctions cooperating to produce a source of constant voltage.

13. Apparatus of the class described comprising: a first and a second electron discharge device each having a cathode and an anode member; means mounting said anode member for movement with temperature; a first and second heater means adapted to heat said cathodes of said first and said second discharge devices respectively; a first and a second thermo-electric means attached to said anode members of said first and said second discharge devices respectively; a source of current; first circuit means connecting said source of current to said anode member and said cathode of said first discharge device, including a first impedance means in series therewith, to cause a first current to flow therethrough, said last named anode member assuming a first temperature corresponding to the magnitude of said first current; second circuit means connecting said source of current to said anode member and said cathode of said second discharge device, including a second impedance means in series therewith, to cause a second current to flow therethrough, said last named anode member assuming a second temperature corresponding to the magnitude of said second current; first amplifier means having an input circuit connected to said first impedance means and an output circuit connected to said first heater means, said first amplifier means being responsive to said first current to maintain said first current at a first constant magnitude thereby maintaining said first thermo-electric means at a first constant temperature; and second amplifier means having an input circuit connected to said second impedance means and an output circuit connected to said second heater means, said second amplifier means being responsive to said second current to maintain said second current at a second constant magnitude thereby maintaining said second thermoelectric means at a second constant temperature, said first and said second thermoelectric means cooperating to produce a source of constant voltage.

14. Apparatus of the class described comprising: a first and a second electron discharge device each having a cathode and an anode member, means mounting said anode member for movement with temperature, each of said anode members having one end thereof rigidly mounted and the remainder thereof free to move in accordance with the temperatures of said anodes respectively; first and second thermoelectric means attached to said anode members of said first and said second discharge devices respectively; a source of current; first circuit means connecting said source of current to said cathode and said anode member of said first discharge device to cause a first current to flow therebetween, said last named anode member assuming a first temperature in accordance with the magnitude of said first current; second circuit means connecting said source of current to said cathode and said anode member of said second discharge device to cause a second current to flow therebetween, said last named anode member assuming a second temperature in accordance with the magnitude of said second current; first means for maintaining said first current at a first constant magnitude thereby maintaining said anode member of said first discharge device and said first thermoelectric means at a first constant temperature; and second means for maintaining said second current at a second constant magnitude thereby maintaining said anode member of said second discharge device and said second thermoelectric means at a second constant temperature, said first and said second thermoelectric means cooperating to produce a source of constant voltage.

15. Apparatus of the class described comprising: a first temperature means having a first constant temperature and second temperature means having a second constant temperature different from said first temperature, each of said temperature means comprising, an electron discharge device having a cathode and an anode member, means mounting said anode member for movement with temperature, a source of current in series with said discharge device allowing current to flow through said device and causing said anode to assume a temperature in accordance with the magnitude of said current, and means responsive to said current for maintaining said current at a constant magnitude; a first thermoelectric means attached to said anode member of said first temperature source; and a second thermoelectric means attached to said anode member of said second temperature source, said second thermoelectric means cooperating with said first thermoelectric means to produce a constant voltage source.

16. Apparatus of the class described comprising: an electron discharge device having cathode and anode surfaces; a source of current; circuit means connecting said source of current to said cathode and anode surfaces to cause current to flow therebetween, said surfaces assuming a temperature in accordance with the magnitude of said current; and temperature responsive means supporting one of said surfaces, said last named means changing position with the temperature of said supported surface, the movement of said last named means being effective to cause said current to be maintained at a constant magnitude.

17. Apparatus of the class described comprising: an electron discharge device having cathode and anode surfaces; a source of current; circuit means connecting said source of current to said cathode and anode surfaces to cause current to flow therebetween, said surfaces assuming a temperature in accordance with the magnitude of said current; and means supporting said anode surface, said last named means being adapted to move said anode surface with respect to said cathode in accordance with the temperature of said anode surface, the movement of said anode supporting means being effective to cause said current to be maintained at a constant magnitude.

18. Apparatus of the class described comprising: an electron discharge device having cathode and anode surfaces; a source of current; circuit means connecting said source of current to said cathode and anode surfaces to cause current to flow therebetween, said surfaces assuming a temperature in accordance with the magnitude of said current; thermoelectric means mounted on said anode surface; and means for supporting said anode surface, said last named means being adapted to move said anode surface with respect to said cathode in accordance with the temperature of said anode surface, the movement of said anode supporting means being effective to cause said current to be maintained at a constant magnitude thereby maintaining said anode surface and said thermoelectric means at a constant temperature.

References Cited in the file of this patent

UNITED STATES PATENTS

| | | |
|---|---|---|
| 2,006,737 | Gessford | July 2, 1935 |
| 2,426,209 | Hartley | Aug. 26, 1947 |